No. 622,868. Patented Apr. 11, 1899.
G. SIMPSON.
BALL BEARING HUB.
(Application filed Dec. 22, 1897.)
(No Model.) 2 Sheets—Sheet 1.
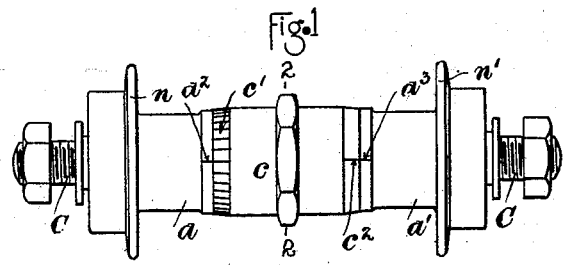
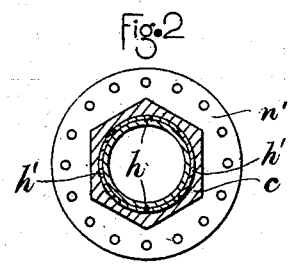
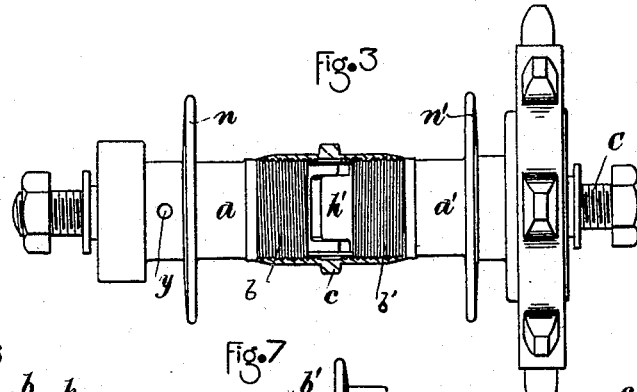
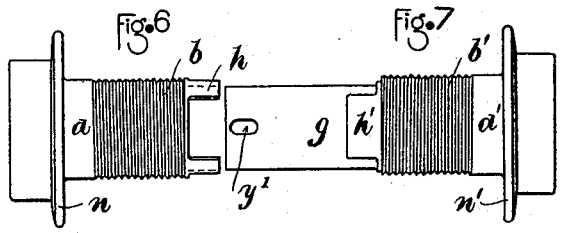
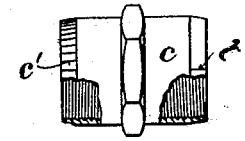
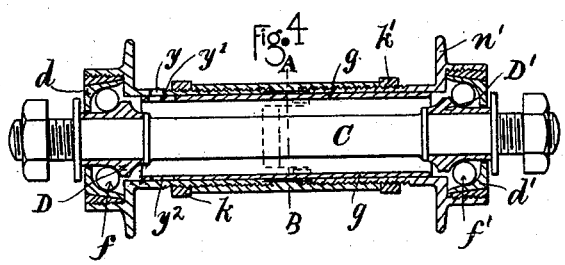
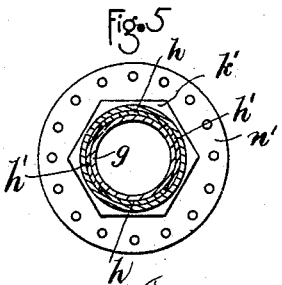
Witnesses
A. D. Harrison.
P. W. Pezzetti.
Inventor
George Simpson
by Wright Brown & Quimby
Attorneys No. 622,868. Patented Apr. 11, 1899.
G. SIMPSON.
BALL BEARING HUB.
(Application filed Dec. 22, 1897.)
(No Model.) 2 Sheets—Sheet 2.
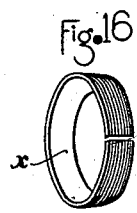
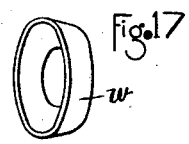
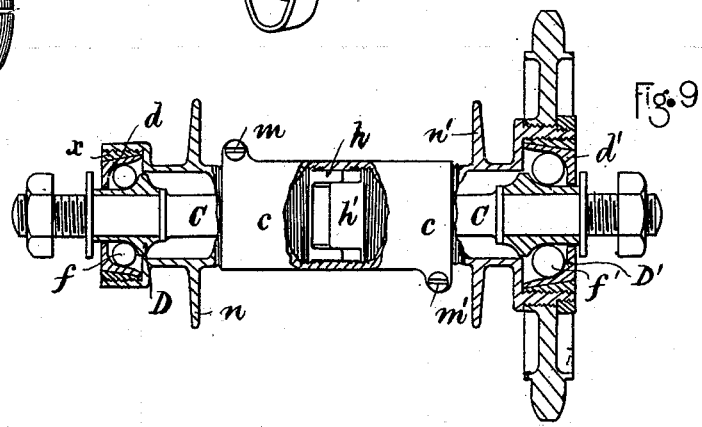
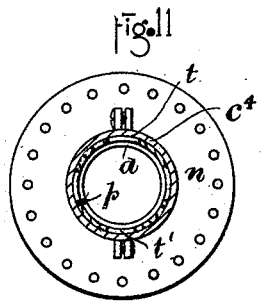
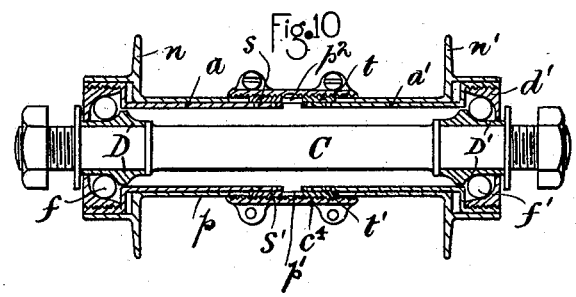
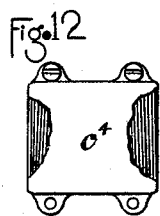
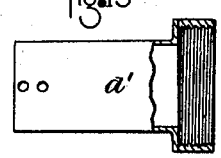
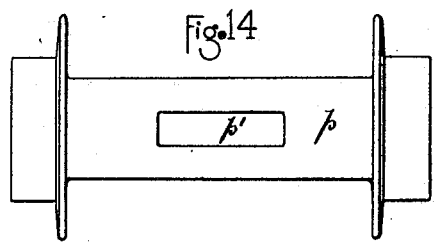
Witnesses
A. D. Hamann
P. W. Pezzetti
Inventor
George Simpson
by Wright Brown Quimby
Attorneys
THE NORRIS PETERS CO., PHOTO-LITHO., WASHINGTON, D. C.

UNITED STATES PATENT OFFICE.

GEORGE SIMPSON, OF CROSSHILLS, ENGLAND.

BALL-BEARING HUB.

SPECIFICATION forming part of Letters Patent No. 622,868, dated April 11, 1899.

Application filed December 22, 1897. Serial No. 662,966. (No model.)

*To all whom it may concern:*

Be it known that I, GEORGE SIMPSON, a subject of the Queen of Great Britain, residing at Crosshills, near Keighley, in the county of York, England, have invented a new and useful Improvement in Ball-Bearing Hubs, of which the following is a specification.

This invention relates to the construction of hubs rotating upon antifriction-ball bearings, such as the hubs of wheels for bicycles and other velocipedes and like vehicles, and has for its object certain improvements in the same whereby the bearing-surfaces on the hub may be readily adjusted relatively to each other or to those on the spindle or shaft upon which the hub revolves, so that it may meet the requirements caused by the wearing of said surfaces.

To this end the invention consists of the improvements hereinafter described, and illustrated by the accompanying sheets of drawings, in which—

Figure 1 is a view of a complete hub and its spindle, the former being constructed in accordance with my invention. Fig. 2 is a section of the hub shown in Fig. 1. Fig. 3 shows the same construction of hub as that shown in Fig. 1; but in this case the turnbuckle is illustrated in section and the parts beneath it are more clearly shown, while on the end of the hub a sprocket-wheel is shown as secured thereto, as is the case in the propelling-wheel of a bicycle. Fig. 4 is a longitudinal section of the hub shown by Figs. 1 and 3, but with another form of turnbuckle thereon, as hereinafter explained. Fig. 5 is a sectional view on line A B of Fig. 4. Figs. 6, 7, and 8 are drawings in detail of the several parts forming the hubs, as is hereinafter described. Fig. 9 is a part-sectional view of a hub of the same construction as that shown by Fig. 3, but illustrates the application of yet another form of turnbuckle. Figs. 10 and 11, respectively, are longitudinal and transverse sections of a modified form of hub, showing how the adjustable parts may be made independent of those parts to which the spokes of the wheel are secured. Figs. 12, 13, 14, and 15 illustrate the several parts of which the hub shown in Figs. 10 and 11 is composed. Figs. 16 and 17 illustrate in detail the screwed bush and its somewhat-conical cup, which are preferably used as the bearings within the hubs, for the purposes hereinafter described.

Similar letters of reference indicate similar parts throughout the several views.

The hubs to which my invention has especial reference are those which revolve about fixed spindles, such as are those at C, and which have somewhat-conical bearing-surfaces D D' securely fixed upon them.

In carrying my invention into effect I construct the hub in parts or sleeve-sections $a$ $a'$, the threads $b$ $b'$ on which are right and left hand, respectively. A turnbuckle $c$, having correspondingly right and left hand threads to mesh with those at $b$ $b'$, is placed upon the sleeve-sections, whereby its rotations about them in one direction or the other will cause the said parts or sections $a$ $a'$ to advance toward or recede from each other. This movement of the parts $a$ $a'$ may be attained by the threads $b$ $b'$ being both in the same direction, provided that they are made of different pitches. The bearing-surfaces $d$ $d'$, fixed to and carried by the parts $a$ $a'$, may be thus moved longitudinally upon the spindles C, so that the space afforded between these two bearing-surfaces $d$ $d'$ and D D' for the operation of the antifriction-balls $f f'$ may be increased or contracted by the rotating of the turnbuckle $c$ to more closely press said balls $f f'$ or to leave them more freedom for their actions, as circumstances may require.

In order to secure an accurate alinement of the axes of the parts or sections $a$ and $a'$ with each other, I form a sleeve $g$ on one of them, as on $a'$, to take into and fit nicely within the other. This sleeve $g$ I preferably form separately from the part $a'$ and afterward secure it rigidly thereto, whereby I am better enabled to form the teeth or indentations $h'$ on said part $a'$ to mesh with corresponding teeth or indentations $h$ on the part $a$, these said teeth $h$ $h'$ being of especial service to the hub when power or force is to be transmitted through it to its rim, as is the case in a bicycle or vehicle propelled by one or other of its wheels. However, where the hub is used in a wheel which merely helps to support the vehicle then these teeth $h$ $h'$ need not be used, and the sleeve $g$ may be formed integrally with the part $a$ or with the part $a'$, as the case may be, while it will slide within the other part.

By having the edge of the turnbuckle $c$ graduated, as at $c'$, and by having a mark $a^2$ on the part $a'$ when the pitch of the screwed threads within the turnbuckle $c$ is known it is easy to determine and indicate the distance that the said turnbuckle $c$ has at any time caused the parts $a\ a'$ to advance toward or recede from each other, while by having other marks $c^2$ and $a^3$ made on the opposite side of said turnbuckle $c$ and on the part $a'$, respectively, and in proper positions relatively with the teeth $h\ h'$ the placing together of these said parts $a\ a'$ by holding them in line with each other, as shown by Fig. 1, and then rotating the turnbuckle $c$ is greatly facilitated. Instead of the turnbuckle $c$ being formed as shown by Fig. 1, should it be found necessary to lock or firmly secure the same thereon, it may be made longer, as shown in Fig. 4, and have a lock-nut $k$ and $k'$ on each side of it for securing it in these positions, or it may be formed as shown in Fig. 9, in which case it has its outer ends split or cut down, and locking-screws $m\ m'$ are arranged to tightly draw the same together and so secure it, as desired.

From the foregoing it will be observed that when the parts $a\ a'$ are moved longitudinally, as described, the outer flanges $n\ n'$ thereon and the spokes that may be secured thereto will be moved also, and that consequently the tension of such spokes will be varied. Though I find by experiment that such variations of tension are so small as to be altogether imperceptible, still should it ever be found to be objectionable I may mount the moving parts $a\ a'$ (see Figs. 10 and 11) within the outer case $p$, which thus carries the flanges $n\ n'$, while slots $p'\ p^2$ are made in this case $p$ for pieces $s\ s'\ t\ t'$, secured to said parts $a\ a'$, respectively, to pass through. These pieces $s\ s'$ and $t\ t'$ have respectively left and right hand volute or spiral ridges and grooves to mesh with the left-hand and right-hand threads in the turnbuckle $c^4$, (which in this case is made in parts, so that it may be fixed upon the outer case $p$.) Thus as this turnbuckle $c^4$ is rotated the parts $a\ a'$ will be moved laterally through the actions of their pieces $s\ s'\ t\ t'$ and so attain the object desired without moving the flanges $n\ n'$, to which the spokes of the wheel may be secured.

In combination with the adjusting devices for the bearing-surfaces above described I preferably employ a hollow cup $w$ to form the bearing-surfaces $d\ d'$, and the outer periphery of this cup $w$ I make of a tapering form to fit within a split annular piece $x$, having its outer periphery screwed or threaded, by which means the farther this annular piece $x$ is screwed into the part for receiving it the farther will it rise upon the outer periphery of the cup $w$ and therefore the more firmly will it be pressed into its position, which is consequently more certainly secured.

To enable the application of lubricant to the interior of the parts $a\ a'$, the openings $y$ are made therein, while further openings $y'\ y^2$ are made in the sleeve $g$ to fall opposite the openings $y$ in the part $a$, so as not to interfere with its application to such parts.

By these provisions the two sleeve-sections are locked against rotation one relatively to the other, this locking of the sleeve-sections together while permitting them to slide longitudinally to elongate or contract their added length being common to all of the forms of the invention herein shown.

Having thus described my invention, what I claim is—

1. In a ball-bearing hub, the combination of two separable externally-threaded sleeve-sections or parts, a sleeve for maintaining said sections or parts in axial alinement, and a turnbuckle encircling said sections for adjusting them with relation to each other.

2. In a ball-bearing hub, the combination of two separable sleeve-sections or parts, said sections or parts having provisions for preventing the rotation of one section relatively to the other, and being externally threaded, a turnbuckle for adjusting said sections toward or from each other, and a sleeve for maintaining said sections or parts in axial alinement.

GEORGE SIMPSON.

Witnesses:
JOHN WHITEHEAD,
PICKLES BAILEY.